United States Patent
McIlwain

[19]

[11] Patent Number: 5,896,782
[45] Date of Patent: Apr. 27, 1999

[54] THROTTLE CONTROL FOR BALER ENGINE

[75] Inventor: Irwin D. McIlwain, Lancaster, Pa.

[73] Assignee: New Holland North America, Inc., New Holland, Pa.

[21] Appl. No.: 08/971,745

[22] Filed: Nov. 17, 1997

[51] Int. Cl.[6] .............................. G05G 1/04; A01D 75/28
[52] U.S. Cl. ........................ 74/519; 74/526; 56/10.2 A; 56/DIG. 7
[58] Field of Search .................. 74/519, 526; 56/10.2 A, 56/DIG. 7, 13.5, 16.4 R

[56] References Cited

U.S. PATENT DOCUMENTS

| | | | |
|---|---|---|---|
| 3,022,622 | 2/1962 | Nolt | ........................................... 56/341 |
| 5,025,614 | 6/1991 | Osborn et al. | .................... 56/16.4 R X |
| 5,048,273 | 9/1991 | Osborn et al. | .................... 56/DIG. 7 X |

OTHER PUBLICATIONS

New Holland Operator's Manual No. 42051521 for the Model 515 Baler—Front & Rear Covers, pp. 2–1 and 4–3. Sep. 1992.

Hesston Operator's Manual No. 700 715 054, for the Model 4690 Baler—Front Cover & Title Page, pp. 62 & 78 Mar. 1996.

*Primary Examiner*—John A. Jeffery
*Assistant Examiner*—Mary Ann Battista
*Attorney, Agent, or Firm*—Larry W. Miller; J. William Stader; Frank A. Seemar

[57] ABSTRACT

An agricultural baler for picking up crop material and forming it into a rectangular shaped package, having a main frame, and an engine mounted on the main frame for operating the baler. The engine includes a throttle, and remotely located controls for changing the condition of the throttle between idle and full open to selectively operate the baler plunger rate from the cab of the towing vehicle, e.g., a tractor or a pickup truck. A control system for the throttle utilizes an electric reversible directional motor assembly having input terminals and an output shaft rotatable at a predetermined speed and direction under conditions where a predetermined voltage at a predetermined polarity is applied across such input terminals. Rotation of the output shaft is translated to pivotal motion of a lever that is coupled to the throttle.

14 Claims, 4 Drawing Sheets

THROTTLE CONTROL FOR BALER ENGINE

FIELD OF THE INVENTION

This invention relates generally to agricultural balers of the type operated by an engine mounted on the baler, and more particularly to a system for remotely controlling the position of the engine throttle.

BACKGROUND OF THE INVENTION

Agricultural balers are implements that pick up crop material, such as straw or hay, from a windrow or swath lying on the ground, deposit it in an infeed housing where it is conveyed by a feeding mechanism through an inlet to a bale forming chamber. In the bale forming chamber the crop material is compressed by a reciprocating plunger to form a rectangular package of compacted crop material that is automatically tied by a tying mechanism to complete the bale that is then discharged rearwardly from the baler. Completed bales are either deposited on the ground for subsequent retrieval or they are transferred by appropriate means to a trailing wagon hitched to the baler. An attachment for throwing the bales into the wagon is one commonly known expedient.

Balers, usually towed behind a tractor, are either powered by an engine mounted on the baler, or by a drive shaft coupled to the PTO of the tractor to which the baler is hitched. Balers are also sometimes towed by a pickup truck and powered by an engine on the baler. It is not uncommon to control and monitor various baler functions from the tractor, and in the case of engine powered balers, the controls for certain engine functions are also remotely accessed. Among such remotely controlled engine functions is engine speed, which in the past has been changed from idle to baling speed by various remote systems. Engine speed is determinative of the strokes per minute of the baler plunger that has an optimized rate for normal operating conditions. A large majority of balers being used today are running at 90 strokes per minute, especially balers in the larger categories, e.g., a rectangular cross section of 15 inches by 22 inches. In some smaller categories, it is not uncommon for the plunger to be running at 70 strokes per minute.

In prior art remote control systems for baler engines, the same general result has been achieved by arrangements for varying engine speed, i.e., the engine throttle is changed from full open to idle positions for operational and idle baler modes, respectively. Applicant is aware of a system in which a cable is used for physically shifting the position of the baler engine throttle via means at a remote location, such as a pivoting lever arm mounted in a convenient location in the cab of the tractor or pickup truck that is towing the baler. It is not uncommon for problems in a system of this nature to reside in the mechanical cable assembly, which by its very nature is vulnerable to damage caused by bending and twisting. Additionally, as a result of the damp and dusty environmental conditions prevalent in the field, the elements of the cable system are also vulnerable to rust and buildup of unwanted crop residue and debris, both of which situations can lead to serious malfunctioning of the baler.

Another well known control system of the same general type is illustrated in U.S. Pat. No. 3,022,622, issued Feb. 27, 1962 in the name of E. B. Nolt, and assigned to the predecessor company of the assignee of the present invention. This patent discloses a system in which a mechanical linkage arrangement is utilized to pivot the throttle between open and closed positions. The position of the baler windguard, which is indicative of the existence of a substantial amount of crop material being picked up, ultimately controls the position of the throttle, i.e., when the wind guard is raised by crop material the throttle is pivoted to its full open position, and when the windguard is lowered in response to minimal crop material being picked up the throttle is closed to the idle position.

In another prior art system a switch is employed to remotely control the position of the throttle by stroking a solenoid that either extends or retracts an actuator arm for operating a linkage assembly. Again, the throttle is either in the fully open operating position or reversed to the closed position with the engine either at normal running speed or at low idle, respectively.

While the performance of all the aforementioned systems is generally satisfactory, there is always a continuing need to optimize the performance and reliability of farm implements. To this end, applicant has provided a unique solution to the above mentioned environmental and mechanical problems encountered by prior art systems.

SUMMARY OF THE INVENTION

An important object of the present invention is to provide a baler engine having improved operational characteristics.

Another object is to provide a baler engine with a system for remotely controlling throttle conditions that optimizes the performance and reliability of the baler.

Yet another object is to provide a baler engine with an electrical control system for remotely varying the condition of the throttle.

Still another object is to provide a baler engine with a system for remotely varying the condition of the engine throttle over a preselected range of positions.

In pursuance of these and other important objects the present invention provides improvements for a baler of the type comprising a main frame, an engine mounted on the main frame for operating the baler, the engine including a throttle, and controls for remotely changing the condition of the throttle from idle to full open. According to its broadest aspects, the present invention contemplates an electric, reversible, directional motor assembly having input terminals and an output shaft rotatable at a predetermined speed and direction under conditions where a predetermined voltage at a predetermined polarity is applied across the input terminals, and mechanical means for coupling the output shaft of the motor to the throttle, wherein the mechanical means comprise lever means pivotable from a first position corresponding to the idle position of the throttle to a second position corresponding to the full open position of the throttle.

The foregoing and other objects, features and advantages of the invention will appear more fully hereinafter from a consideration of the detailed description which follows, in conjunction with the accompanying sheets of drawings wherein one principal embodiment of the invention is illustrated by way of example.

DESCRIPTION OF THE PREFERRED EMBODIMENT

Figure 1:
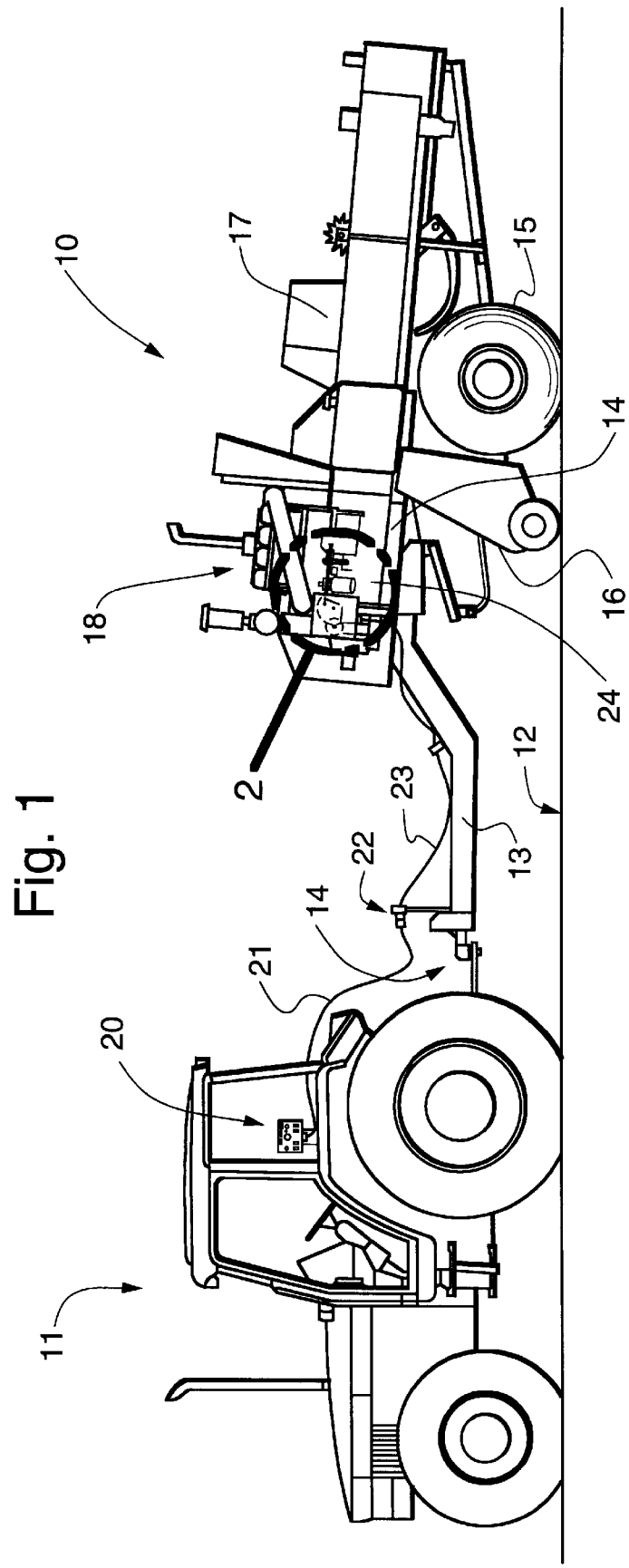
FIG. 1 is a side elevational view of a tractor and a baler in which the present invention is embodied.

Referring now to the drawings for a more detailed description of the invention, FIG. 1 shows an agricultural baler, generally designated by reference numeral 10, hitched to a tractor, generally designated by reference numeral 11, for towing the baler over field 12 on which crop material such as hay, straw, silage grass, or the like has been deposited in windrows or swaths. A tongue 13 extending from baler 10 is coupled to tractor 11 via a hitch assembly 14 in a conventional manner.

Agricultural balers generally comprise a main frame 14 supported on a pair of ground engaging wheels 15 (only one shown). A pickup 16 is mounted on main frame 14 for feeding crop material to a baling chamber in which it is compressed into successive rectangular packages under action of a continuously operating plunger which reciprocates in a fore and aft direction inside the baling chamber in a known manner. When a particular package reaches a predetermined length a tying mechanism 17 is operated to encircle the completed package with a plurality of strands that are knotted together to form a finished bale which is ultimately extruded rearwardly from the baler as successive bales are being formed.

Figure 2:
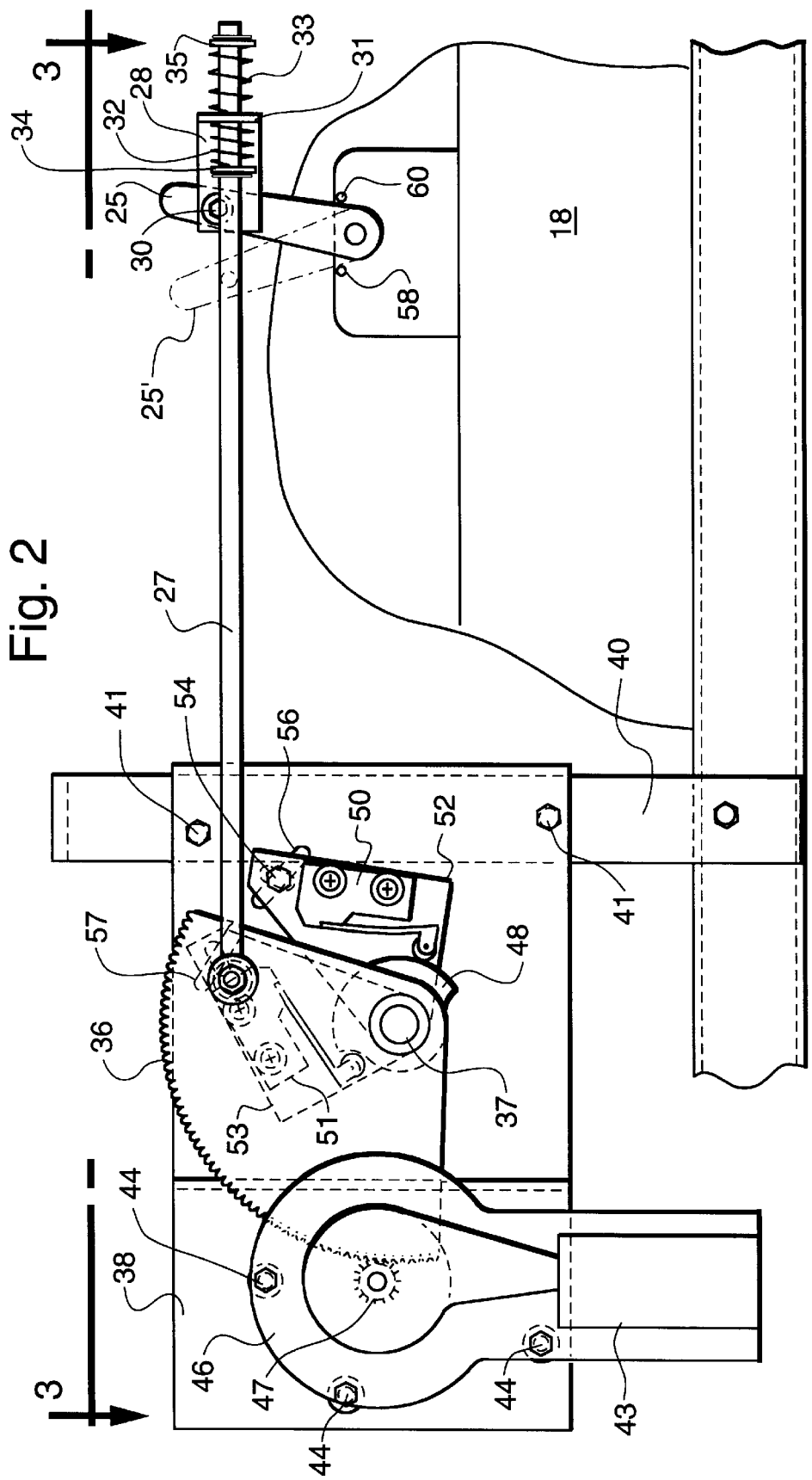
FIG. 2 is a side elevational view showing an enlargement of the area identified by circle "21", in FIG. 1.
Figure 3:
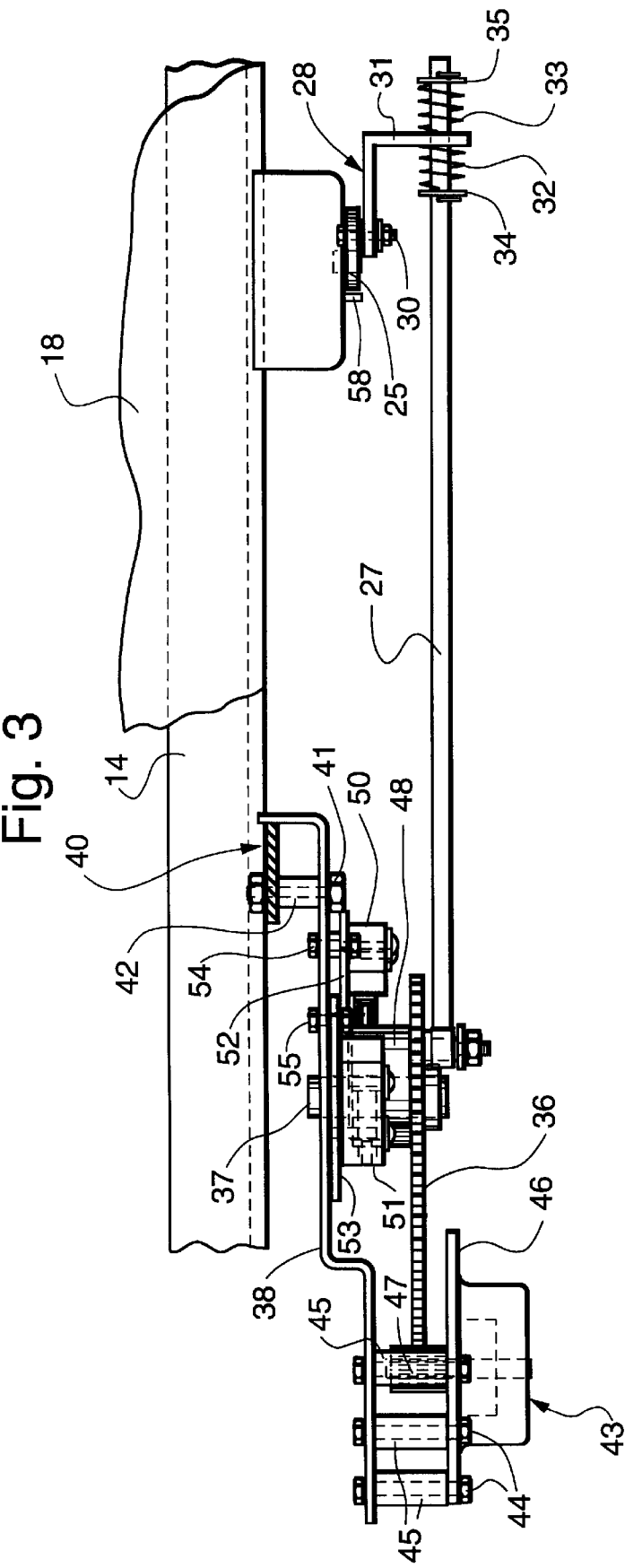
FIG. 3 is a view taken in the direction of arrows 3—3 of FIG. 2.
Figure 4:
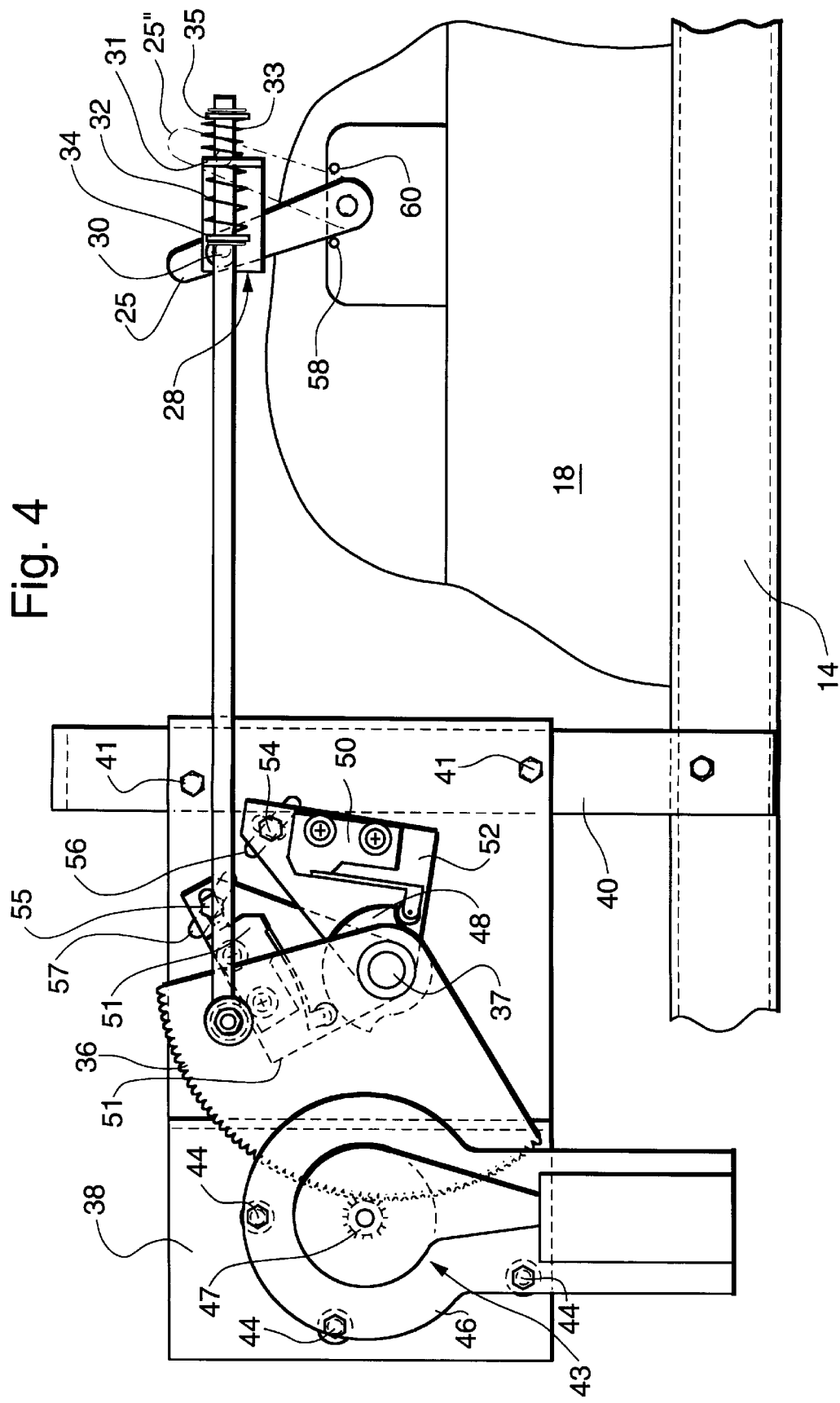
FIG. 4 is a view similar to FIG. 2 with the relative positions of the elements changed to correspond to the idle position of the throttle.

An engine, generally-designated by reference numeral 18, mounted on baler main frame 14, operates the plunger, as well as other parts of the baler such as, e.g., the pickup and the knotters. A control box 20 mounted in the tractor cab is connected to baler 10 via cable 21, a quick disconnect coupler 22 and cable 23. Cables of this nature and for this general purpose are commonly referred to as wiring harnesses. At the heart of the present invention is engine throttle control system 24 for engine 18, shown generally in FIG. 1 within circle "2", an enlargement of which is shown in elevation in FIGS. 2 and 4. FIG. 2 shows the relationship of the elements of the system during normal field operating conditions, while FIG. 4 shows the same elements under conditions where the engine is idling.

Turning first to FIG. 2, throttle control arm 25 of engine 18 is shown in solid lines depicting the full throttle position of the engine and in phantom outline 25' depicting the idle position. A rod 27 is connected to throttle control arm 25 by means of angle bracket 28 and pivot 30. An aperture in end flange 31 of bracket 28 accommodates one end of rod 27, which flange is held between first compression spring 32, shown in compressed condition, and second compression spring 33, shown in expanded condition. The ends of springs 32 and 33 are anchored in rod 27 outwardly of collars 34 and 35, respectively.

The distal end of rod 27 is pivotally attached to a gear segment 36, which gear is pivotally mounted on fixed pivot pin 37 extending from a sub frame 38. A vertical support element 40, affixed to main frame 14, rigidly supports sub frame 38, both of which are secured together in a spaced relationship by bolts 41 and sleeves 42 (only one shown). Also attached to sub frame 38 is a hermetically sealed motor and reducing gear assembly, all of which is generally designated by reference numeral 43, by means of a plurality of bolts 44, spacers 45 and integral mounting flange 46. Assembly 43, sold by Delco Corporation under Part No. 5045739 comprises a 12 Volt DC permanent magnet field, reversible direction, intermittent duty, motor in combination with appropriate reduction gearing for operating a slow speed output pinion gear 47. This assembly and similar other assemblies are commonly employed in the automotive industry for automatic operation of car windows. In accordance with the manufacturer's specifications, by applying a predetermined voltage at a predetermined polarity to the terminals of the assembly the output pinion gear will rotate in a predetermined direction within a predetermined RPM and torque ranges.

Pinion gear 47 meshes with the teeth on gear segment 36 mounted to rotate about pivot pin 37 conjointly with a cam 48. First and second micro switches 50 and 51 are operatively associated with cam 48 whereby second micro switch 51 senses the extended position of rod 27 under the conditions illustrated in FIG. 2, and first micro switch 50 senses the retracted position of rod 27 under conditions illustrated in FIG. 4, discussed in further detail hereinbelow. Completing the micro switch mounting assemblies are first and second rotatably mounted plates 52 and 53, respectively, to which the first and second micro switches are affixed. Plates 52 and 53, adjustably secured to sub frame 38, are maintained in place by bolts 54 and 55, selectively secured along arcuate slots 56 and 57, respectively, extending circumferentially with respect to pivot 37.

In operation, the motor in assembly 43 is energized to rotate pinion 47, which in turn rotates gear segment 36 about its fixed pivot 37. This causes rod 27 to move in a general linear direction and rotate throttle control arm 25 between positions physically limited by stops 58 and 60, and electrically limited by first and second micro switches 50 and 51. When throttle control arm 25 is in the leftmost position, shown in phantom outline (designated 25') in FIG. 2 and solid outline in FIG. 4, the engine idles at about 1100 RPM driving the plunger at about 45 strokes per minute (SPM). In the full throttle position of throttle control arm 25, shown in solid outline in FIG. 2 and phantom outline (designated 25") in FIG. 4, the engine is running at 2200 RPM with the plunger reciprocating at 90 SPM.

More specifically, the two conditions illustrated in FIGS. 2 and 4 correspond to normal baling and non baling conditions of the baler, respectively. By applying voltage to assembly 43 at a positive or negative polarity, rotational direction of pinion gear 47 is determined in a conventional manner to move rod 27 between the two illustrated positions. Interruption of such voltage, regardless of polarity, selectively stops throttle control arm 25 at any intermediate position which thereby reduces the strokes per minute at which the baler plunger reciprocates providing an infinite adjustment range of engine speeds.

The electrical control box 20, shown mounted on the tractor, is coupled to assembly 43 via cable 21, 22 to accommodate remote control of baler engine 18, as well as any other functions for which electrical control is desired. The 12 Volt DC battery on the tractor is utilized to provide a system voltage source that is ultimately coupled to assembly 43 via cable 21, 23 and through micro switches 50 and 51. This system voltage for the motor is connected to a conventional three position rocker switch (not shown), which is normally in the off position. When the switch is rocked to either side from its center position the motor is coupled to the voltage source at one polarity corresponding to one side of the rocker switch and the opposite polarity corresponding to the other side of the rocker switch. In operation, the throttle control arm will pivot from one stop to the other in about two seconds. If desirable the engine can be operated at a mid range speed when crop material being picked up is generally light, or when returning to the field to pick up crop material missed during the initial pass. To accomplish this the toggle switch is held in its on position for a selected interval less than two seconds.

It should be noted that, as pointed out above, micro switches 50 and 51 can be adjusted along slots 56 and 57 to vary the rotational relationship between the switches and the ramps of cam 48. This permits the point at which micro switch 51 interrupts the voltage to be accurately set to correspond to the position whereat first compression spring 32 is slightly compressed under conditions where throttle control arm is against stop 60. This positive setting of control arm 25 prevents speed hunting due to power fluctuations from variations in the plunger load during baling. Likewise, adjustment of the other micro switch 50 serves the same purpose of establishing a positive setting of the control arm with respect to stop 58, as shown in FIG. 4.

Of the many implicit and explicit advantages of the present invention one of the most important is the provision of a throttle control for a baler engine that operates over an infinite range of adjustments to provide efficient and effective operation. This allows the power output of the engine to be remotely adjusted to conserve energy during such time as the baler is temporarily not baling, e.g., traversing the headlands. Other examples of when the opportunity to conserve energy arises is during baling in sparse windrow conditions, or during return trips to the field for clean up excursions as mentioned above.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. In a baler for picking up crop material and forming it into a rectangular shaped package, comprising
   a main frame,
   an engine mounted on said main frame for operating the baler,
   said engine including a throttle, and
   controls for remotely changing the condition of said throttle from idle to full open, the improvement comprising
      an electric reversible directional motor assembly having input terminals and an output shaft rotatable at a predetermined speed and direction under conditions where a predetermined voltage at a predetermined polarity is applied across said input terminals,
      mechanical means for coupling said output shaft of said motor assembly to said throttle,
      said mechanical means comprise a lever pivotable from a first position corresponding to said idle condition of said throttle to a second position corresponding to said full open condition of said throttle.

2. In a baler as set forth in claim 1 wherein said mechanical means further comprise
   means for varying the condition of said lever to a plurality of intermediate conditions corresponding to a like plurality of throttle conditions between said idle and full open conditions.

3. In a baler as set forth in claim 2 wherein said mechanical means further comprise
   a pinion attached to said output shaft, a gear segment operatively associated with said pinion, said gear segment rotatable about a pivot fixed relative to said shaft, and
   rigid means extending between said segment and said lever for translating rotational movement of said segment about said pivot to pivotal movement of said lever.

4. In a baler as set forth in claim 2 wherein said improvement further comprises
   first and second limit switches for interrupting said predetermined voltage under conditions where said lever reaches said first and second positions, respectively.

5. In a baler as set forth in claim 4 wherein said mechanical means further comprise
   first and second stop means for limiting said lever in said first and second positions, respectively, and
   resilient means coupled to said lever for maintaining said lever against said stop means.

6. In a baler as set forth in claim 4 wherein said mechanical means further comprises
   a cam affixed to a gear segment for conjoint movement therewith, said cam having surfaces that operationally engages said first and second limit switches for interrupting said predetermined voltage.

7. In a baler as set forth in claim 6 wherein said mechanical means further comprise
   first and second stop means for limiting said lever in said first and second positions, respectively, and
   resilient means coupled to said lever for maintaining said lever against said stop means.

8. In a baler for picking up crop material and forming it into a rectangular shaped package, comprising
   a main frame,
   an engine mounted on said main frame for operating the baler,
   said engine including a throttle, and
   controls for remotely changing the condition of said throttle from idle to full open, the improvement comprising
      an electric motor assembly comprising an output shaft, a gear train coupled to said output shaft, and a DC motor driving said gear train to rotate said output shaft at a predetermined speed,
      mechanical means for coupling said output shaft of said motor assembly to said throttle,
      said mechanical means comprise a lever pivotable from a first position corresponding to said idle condition of said throttle to a second position corresponding to said full open condition of said throttle.

9. In a baler as set forth in claim 8 wherein said mechanical means further comprise
   means for varying the position of said lever to a plurality of intermediate positions corresponding to a like plurality of throttle conditions between said idle and full open conditions.

10. In a baler as set forth in claim 9 wherein said mechanical means further comprise
    a pinion attached to said output shaft,
    a gear segment operatively associated with said pinion, said gear segment rotatable about a pivot fixed relative to said shaft, and
    rigid means extending between said segment and said lever for translating rotational movement of said segment about said pivot to pivotal movement of said lever.

11. In a baler as set forth in claim 9 wherein said improvement further comprises first and second limit switches for interrupting a predetermined voltage under conditions where said lever reaches said first and second positions, respectively.

12. In a baler as set forth in claim 11 wherein said mechanical means further comprise first and second stop means for limiting said lever in said first and second positions, respectively, and resilient means coupled to said lever for maintaining said lever against said stop means.

13. In a baler as set forth in claim 11 wherein said mechanical means further comprises a cam affixed to a gear segment for conjoint movement therewith, said cam having surfaces that operationally engage said first and second limit switches for interrupting said predetermined voltage.

14. In a baler as set forth in claim 13 wherein said mechanical means further comprise first and second stop means for limiting said lever in said first and second positions, respectively, and resilient means coupled to said lever for maintaining said lever against said stop means.

* * * * *